United States Patent [19]

Risk

[11] 4,210,535
[45] Jul. 1, 1980

[54] MAGNETIC TREATMENT DEVICES FOR WATER PIPELINES

[76] Inventor: George Risk, 716 E. 5th St., Kimball, Nebr. 69145

[21] Appl. No.: 965,941

[22] Filed: Dec. 4, 1978

[51] Int. Cl.² .................................................. B01D 35/06
[52] U.S. Cl. ................................................... 210/222
[58] Field of Search .................... 210/222; 269/1, 2, 3, 269/6, 16, 26, 41, 60, 76, 77, 78, 80, 90, 95, 97, 101

[56] References Cited

U.S. PATENT DOCUMENTS

| | | | |
|---|---|---|---|
| 724,091 | 3/1903 | Fisher | 269/3 |
| 2,579,151 | 12/1951 | Lloyd | 269/87 |
| 2,652,925 | 9/1953 | Vermeiren | 210/222 |
| 2,825,464 | 3/1958 | Mack | 210/222 |
| 2,851,913 | 9/1958 | Ramoneda | 269/90 |
| 3,228,878 | 1/1966 | Moody | 210/222 |
| 3,511,776 | 5/1970 | Arampato | 210/222 |
| 3,608,718 | 9/1971 | Aubrey, Jr. | 210/222 |
| 3,743,566 | 7/1973 | Loutham et al. | 269/41 |
| 3,951,807 | 4/1976 | Sanderson | 210/222 |
| 4,066,544 | 1/1978 | Stark | 210/222 |

FOREIGN PATENT DOCUMENTS 58797 6/1890 Fed. Rep. of Germany .......... 210/222

Primary Examiner—Theodore A. Granger
Attorney, Agent, or Firm—George R. Nimmer

[57] ABSTRACT

Disclosed are magnetic treatment devices adaptable for conveniently removably installed combination with pipeline systems extending from a reservoir of ion-laden water and terminating remotely downstream therefrom at the consumer's water-tap or other outlet-valve. The water treatment device comprises spaced-apart magnetic poles of opposite polarity for treatably altering the water ionic characteristics and which magnetic poles are maintained alongside the pipeline segment with novel holding, anchoring, and mounting means. There is too the provision to ensure a grounded condition for the magnetic poles if the pipeline segment is not itself grounded to the earth.

3 Claims, 8 Drawing Figures

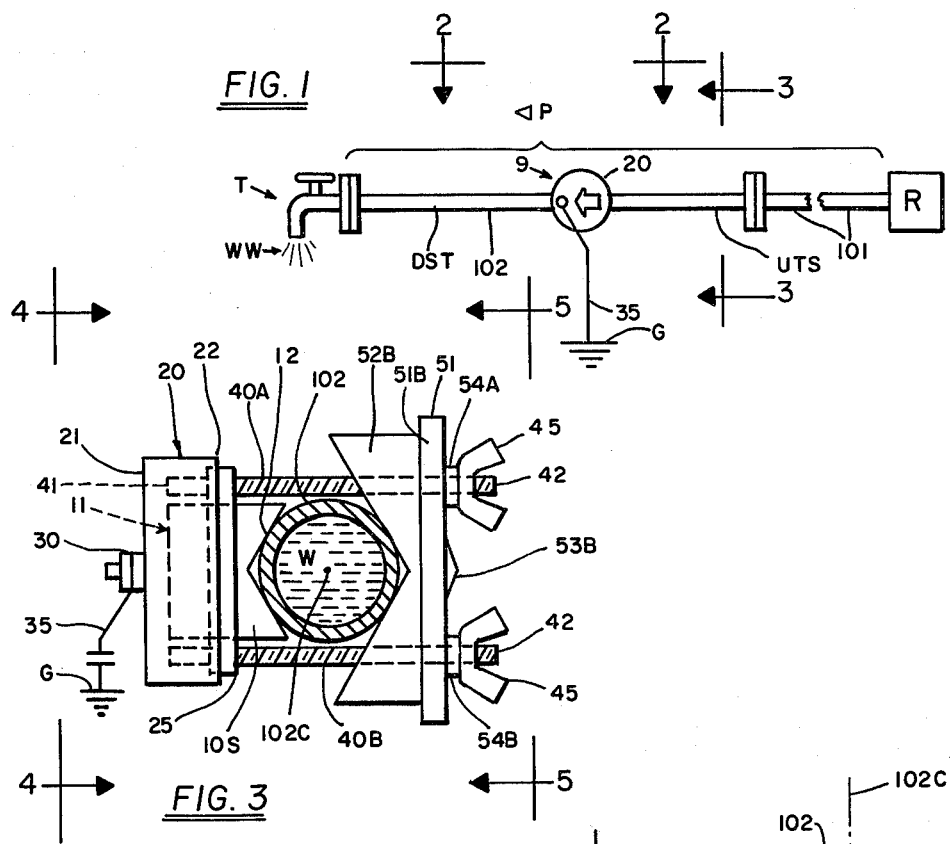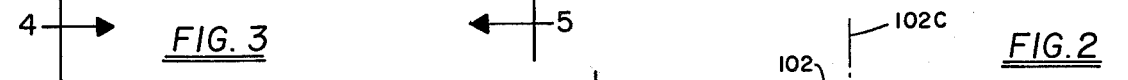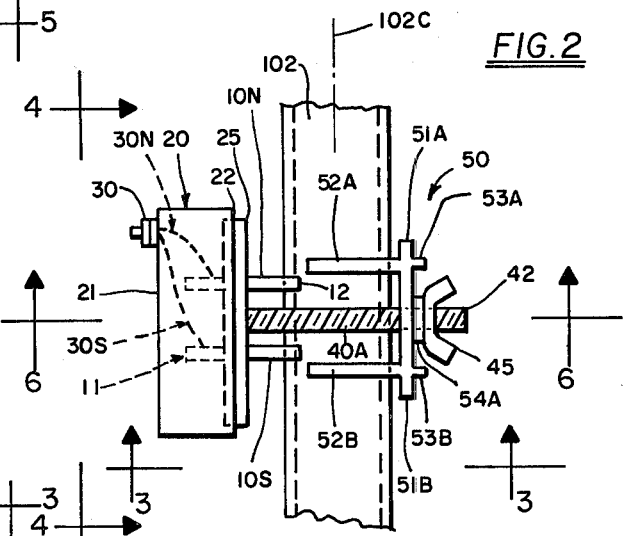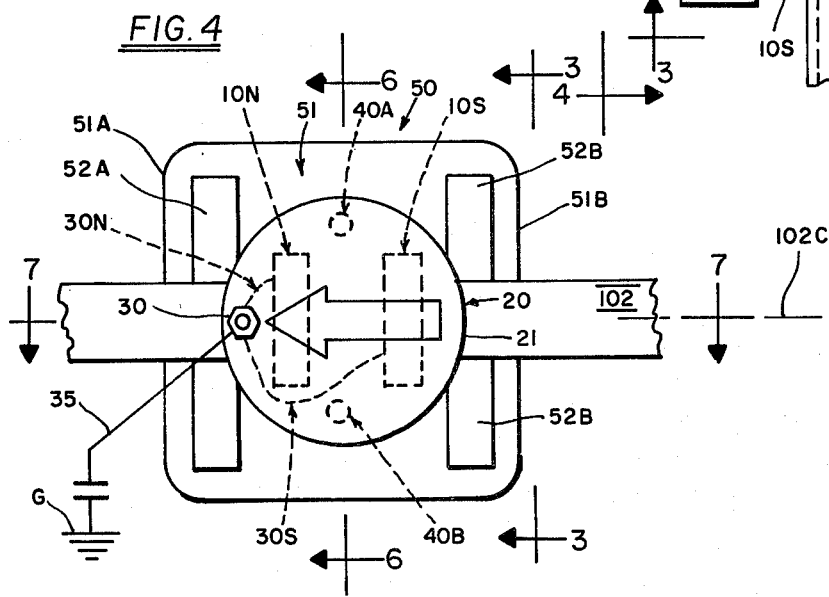

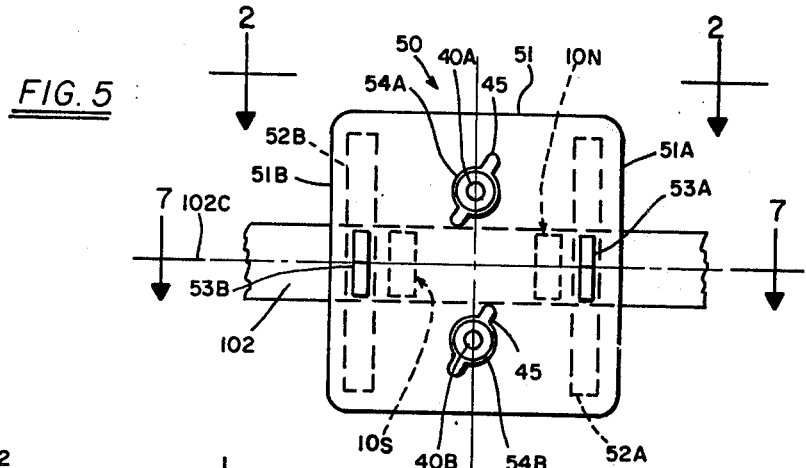
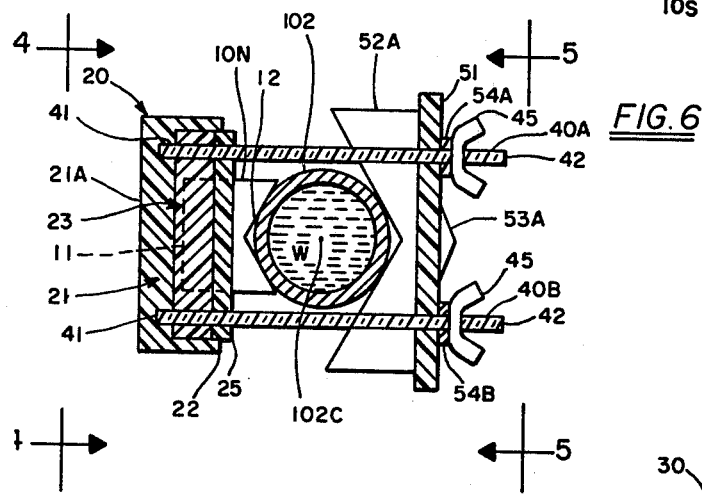

MAGNETIC TREATMENT DEVICES FOR WATER PIPELINES

Numerous prior art patents, including inter alia U.S. Pat. Nos. 2,652,925 and 2,825,464, teach the general concept that magnetic flux applied across the central-axis of pipeline conduits for ion-laden water will alter the ionic characteristics and to very marked improvements readily discernible by the householder or other water consumer. However, prior art magnetic treatment devices tend to suffer from one or more of the following disadvantages and deficiencies. Generally speaking, prior art devices do not lend themselves to convenient ready installation, and which is especially troublesome for the typical domestic householder having only rudimentary skills and tools. Many prior art devices tend to be of a bulky and cumbersome construction and not well suited for spatial constraints imposed by most domestic plumbing situations. Others entail such capital investment and external electrical wiring as to discourage typical householders from employing them. Prior art devices are usually not amenable to the alternative arbitrary selection of eccentric and concentric magnetic flux patterns about the pipeline central-axis. Another serious problem encountered with prior art structures is that operability may be affected unless the pipeline at the installation point is electrically grounded to the earth, which is an ever increasing problems currently when resinous and other non-ferrous pipe-segments are employed, particularly within domestic households.

With the above and other prior art deficiencies in view and with the general objective herein being to overcome them, which will become more apparent as this description proceeds, the removably installable magnetic treatment devices of the present invention generally comprise: at least as pair of magnetic poles having opposite polarity and with a fixed spatial gap therebetween as provided by a suitable holder means, which holder means preferably includes a non-magnetic housing and anchoring means therein for establishing said fixed spatial gap, and said magnetic poles being removably mounted in transversely extending relationship to the external side of the pipeline with suitable mounting means that preferably includes a pair of parallel threaded bolts rigidly transversely extending from the holder means to a laterally extending cooperative member on the opposite side of the pipe-segment, such as a novel bridger member which might take the form of another like housing if concentric flux patterns are desired.

In the drawing, wherein like characters refer to like parts in the several views and in which:

FIG. 1 is a schematic elevational view of a typical water pipeline system with which the magnetic treatment devices of the present invention might be removably securely installed and employed;

FIG. 2 is a top plan view, as seen in the direction of lines 2—2 of FIGS. 1 and 5, of a representative embodiment of the water treatment devices of the present invention;

FIG. 3 is a sectional elevational view taken along lines 3—3 of FIGS. 1, 2, and 4;

FIG. 4 is a detail side elevational view of FIG. 1 and also taken along lines 4—4 of FIGS. 2, 3, and 6;

FIG. 5 is a detail side elevational view and taken in the direction of lines 5—5 of FIGS. 3 and 6;

FIG. 6 is a sectional elevational view taken along lines 6—6 of FIG. 4;

FIG. 7 is a sectional plan view taken along lines 7—7 of FIGS. 4 and 5; and

FIG. 8, which is related to FIG. 3, depicts an alternate embodiment "99" magnetic treatment device.

FIG. 1 schematically illustrates a typical water pipeline system with which the water treatment devices e.g. 9, of the present invention might be removably securely installed and employed. A conventional pipeline system extends from a reservoir "R" of ion-laden water "W", said reservoir "R" typically taking the form of municipal or rural tank or the like. At the system downstream terminii there is one or more outlet-valves e.g. water tap "T", at which the householder or other consumer withdraws water. The actual pipeline extending from reservoir "R" to an outlet-valve e.g. "T", customarily includes numerous distinct pipe-segments fastended in end-to-end relationship. Herein, the final pipe-segment 102 spans the longitudinally extending length from outlet-valve "T" to the next pipe-segment 101. Some finite overall hydrostatic pressure drop P exists along the pipeline system. The magnetic treatment device e.g. 9, 99, is removably securely attached to a selected pipe-segment (e.g. 102) which is located nearer to the outlet-valve than to the reservoir upstream. The characters "UST" and "DST" refer to the "upstream" and the "downstream" locations, respectively, of pipe-segment 102 relative the installed position of the water treatment device e.g. 9, 99. "G" indicates the earth's surface.

Commencing from a suitable reservoir "R", the ion-laden water "W" flows concentrically along pipeline central-axis 102C, but by virtue of magnetic flux intersecting central-axis 102C and emanated from the water treatment device e.g. 9, 99, the ionic characteristics are altered thereby and discernible in the form "WW" to the water consumer at "T". Improvements for water form "WW" include more palatable taste, better sudsing action, and less corrosion to utensils, etc. The efficaceous magnetic flux is generated by at least a pair of magnetic poles stationed at the external side of a selected pipe-segment e.g. 102, one of which is a Northpole and the other of which is a South-pole. Non-magnetic holding and/or anchoring means maintain a fixedly separated relationship between the opposite polarity members e.g. 10N and 10S, with the spatial gap directionally parallel to central-axis 102C.

Preferably, the magnetic poles are in the form of permanent bar magnets, each extending directionally transversely from the pipe-segment (e.g. 102) and preferably directly (e.g. at 12) directly abutting same. Magnetic flux having a strength of at least 500 Gauss is usually sufficient to adequately treat ion-laden water "W" flowing along pipe-segments 101–102 of about 1-inch diameter, as typically used in households. Such magnetic flux strength will suffice even when the cooperating team of magnetic poles e.g. 10N and 10S, is relegated to a single quadrant of axis 102C whereby the magnetic flux pattern is eccentrically offset as viewed in transverse section through axis 102C.

The holding means herein depicted is a cylindrical hollow container 20 of non-magnetic structural material e.g. resin, and having a closed end 21 with exposed planar circular surface 21A and also having a circularly annular open end 22 located nearer pipe-segment 102 than is closed end 21. Another non-magnetic material e.g. moldable resin, is utilized within housing 20 as an anchoring means 23 to establish and maintain said fixed spatial gap between magnetic poles 10N and 10S. The lower portion including the bottom end 11 of the bar magnets 10N and 10S is embedded within anchoring means 23, while the upper portion extends directionally transversely through the housing lid 25 (covering open end 22) and finally terminating at 12 adjacent the pipe-segment external side. Herein, the bar magnets are of identical size and shape and parallel to each other; preferably, their terminii 12 are of V-shaped recessed configuration for firmly abutting the external side of the selected pipe-segment e.g. 102. Lid 25 includes apertures to permit passage therethrough of the transversely extending members 10N, 10S, 40A, and 40B.

It is important that the "North" magnetic pole be located downstream the "South" magnetic pole, so as to ensure a return path to the earth "G" for electrons. In order to correctly establish this relative downstream positioning of the "North" magnetic pole during the housing installation, the housing might be provided with a directional indicator pointing toward "DST", such as an arrowhead inscribed onto surface 21A.

It is desirable that the pipe-segment onto which the magnetic treatment device is installed be grounded to the earth "G". Though such grounded condition inherently exists for many pipeline systems, in some instances the pipeline might include some electrically non-conductive segment e.g. when some segment is of resinous material, and the pipeline system itself does not provide the grounding between the magnetic treatment device and the earth "G". For the contingency of an encountered non-grounded pipeline, an elongate electrically conductive wire 35 is utilized. In this vein, the housing closed end 21 might carry an electrical terminal 30 for securing thereto an elongate grounding wire 35. To the terminal 30, one and preferably all of the magnetic poles is electrically connected, such as with independent wires 30N and 30S embedded within anchoring means 23. The terminal 30 also provides a convenient means for connecting a meter during the installation of the treatment device e.g. 9, to determine if ancillary installation of a grounding wire 35 is necessary.

Suitable mounting means are employed to maintain the magnetic poles e.g. 10N and 10S, adjacently nearby, and preferably in directly abutting, relationship to the appropriate pipe-segment e.g. 102. Especially readily securely and removably installable mounting means include a pair of parallel and laterally separated threaded bolts e.g. 40A and 40B, which are rigidly secured to the holding means and extend directionally transversely therefrom. Thus, the holding means and the two threaded bolts collectively surround about three quadrants of the pipe-segment, while a suitable laterally extending bridger member e.g. 50, 20, etc., provides the fourth quadrant and completes a surrounding relationship to the pipe-segment. Herein, each of the threaded bolts has its lower end 41 threadedly or otherwise rigidly secured to the housing closed end 21 (though obscured by surface 21A) and additionally strengthened by anchoring means 23. Thus, the lower portion of bolts 40A and 40B are surrounded by housing open end 22 and pass through laterally separated apertures of closure lid 25. The upper portion of bolts 40A and 40B pass through laterally separated apertures e.g. 54A–54B, 29A–29B, etc., of the bridger member. Ultimately, threaded nuts e.g. wingnuts 45, are employed adjacent the threaded bolts' upper ends 42 to draw the intervening and laterally extending bridger element e.g. 20A, 50, against the surrounded pipe-segment and thereby completeing the installation.

Bridger element 50 depicted in FIGS. 2–7 is especially aptly constructed for use with the situation where the magnetic flux pattern is to be eccentric of the pipeline central-axis 102C. Bridger embodiment 50 comprises a plate-like web member 51 extending directionally laterally along web-axis 51C and includes lateral-edges 51A and 51B on opposite sides of and substantially parallel to axis 51C. Web 51 at lateral separations of axis 51C is structurally reinforced at perforate bosses 54A and 54B, for passage therethrough of bolts 40A and 40B, respectively. Bridger element 50 also comprises a pair of laterally extending identical dogs 52A and 52B spaced on opposite sides of and substantially parallel axis 51C, dogs 52A and 52B extending directionally transversely inwardly from web 51 toward pipe-segment 102. Desireably, inward terminii of dogs 52A and 52B are V-shaped or otherwise recessed for securely abutting the pipe-segment, in analogous fashion to magnets' terminii 12. A pair of laterally extending strengthening ribs 53A and 53B are herein spaced on opposite sides of axis 51C, ribs 53A and 53B extending directionally transversely outwardly of web 51 i.e. away from pipe-segment 102. Preferably, web 51, bosses 54, dogs 52, and ribs 53 are together singularly constructed from resinous material and hence amenable to economical one-piece molding.

Magnetic treatment device embodiment 99 of FIG. 8 differs from embodiment 9 of FIGS. 2–7 in that element 20A is substituted for bridger 50. Element 20A includes the aforedescribed components 21–25, 10N, 10S, and 12, but not bolts 40A and 40B. Instead of the provision for transversely rigidly extending bolts 40A and 40B, element 20A has transversely extending bores 29A and 29B (analagous to perforate bosses 54A and 54B) for passage therethrough of bolts 40A and 40B from unit 20 of FIGS. 2–7. Fasteners e.g. 45, are employed for drawing the intervening bridger embodiment 20A against the surrounded pipe-segment and thereby completing an installation 99 wherein the magnetic flux pattern concentrically surrounds the pipeline central-axis 102C.

From the foregoing, the construction and operation of the magnetic treatment devices will be readily understood and further explanation is believed to be unnecessary. However, since numerous modifications and changes will readily occur to those skilled in the art, it is not desired to limit the invention to the exact constructions shown and described, and accordingly, all suitable modifications and changes may be resorted to, falling within the scope of the appended claims.

What is claimed is as follows:

1. In removable combination with a water pipeline extending from a reservoir of iod-laden water and terminating remotely downstream therefrom at the water consumer's outlet-valve, a magnetic treatment device removably securably associated with a selected pipe-segment of the pipeline and which is located nearer to the outlet-valve than to the upstream water reservoir and said selected pipe-segment surrounding a central-axis along which the water concentrically flows, said removably secured treatment device providing magnetic flux intersecting said central-axis whereby the water flowing therethrough has its ionic characteristics altered thereat and discernible to the water consumer at the outlet-valve, said magnetic treatment device comprising at least a pair of magnetic poles one of which is a North-pole and the other of which is a South-pole, said poles being in a fixedly separated relationship with the gap therebetween being directionally parallel said central-axis as defined by a suitable holder means, said holder means including a non-magnetic housing having non-magnetic anchoring means therein to maintain the magnetic poles in said fixedly separated relationship, the magnetic poles extending from the housing and terminally located immediately adjacent the pipe-segment external side, said housing carrying a directional indicator to visually indicate that the housing should be mounted with the North-pole located downstream of the South-pole, said housing being maintained adjacent the pipe-segment with suitable mounting means comprising a pair of parallel and laterally separated threaded bolts rigidly extending from the housing and passing through a structurally reinforced portion of the web of a laterally extending bridger member located opposite the magnetic poles and comprising the following parts in structurally continuous relationship:

A. a laterally extending web,
B. a pair of laterally extending identical dogs which are separated directionally parallel the central-axis and extending transversely directionally from the web with inwardly recessed terminii abutting the pipe-segment, and
C. a pair of laterally extending strengtheing ribs respectively extending transversely from the web and directionally opposite the dogs' protuberance of the web juncture between the dogs and the ribs; and wing nuts threadedly engaged with the bolts to draw the bridger dogs tightly against the intervening pipe-segment.

2. The combination of claim 1 wherein the magnetic poles are permanent magnets.

3. The combination of claim 2 wherein the magnetic poles are in directly abutting relationship to the pipe-segment.

* * * * *